US012734625B2

(12) United States Patent
Yang et al.

(10) Patent No.: US 12,734,625 B2
(45) Date of Patent: Sep. 15, 2026

(54) SELF-POWERED SENSING TOOL HOLDER

(71) Applicant: NATIONAL KAOHSIUNG UNIVERSITY OF SCIENCE AND TECHNOLOGY, Kaohsiung City (TW)

(72) Inventors: Hao-Ching Yang, Tainan City (TW); Hsuan Yi Lu, Kaohsiung City (TW)

(73) Assignee: NATIONAL KAOHSIUNG UNIVERSITY OF SCIENCE AND TECHNOLOGY, Kaohsiung City (TW)

( * ) Notice: Subject to any disclaimer, the term of this patent is extended or adjusted under 35 U.S.C. 154(b) by 340 days.

(21) Appl. No.: 18/398,176

(22) Filed: Dec. 28, 2023

(65) Prior Publication Data

US 2025/0205840 A1 Jun. 26, 2025

(30) Foreign Application Priority Data

Dec. 20, 2023 (TW) ................................ 112149835

(51) Int. Cl.

| | |
|---|---|
| ***B23Q 3/15*** | (2006.01) |
| ***B23Q 3/155*** | (2006.01) |
| ***B23Q 17/22*** | (2006.01) |
| *B23Q 17/09* | (2006.01) |

(52) U.S. Cl.

CPC ..... *B23Q 3/15526* (2013.01); *B23Q 17/2225* (2013.01)

(58) Field of Classification Search

CPC ............ B23Q 3/15526; B23Q 17/2225; B23Q 17/0952; B23Q 2220/008; B23Q 1/0009

See application file for complete search history.

(56) References Cited

U.S. PATENT DOCUMENTS

| | | | | |
|---|---|---|---|---|
| 6,424,821 | B1 * | 7/2002 | Komai | G05B 19/4142 455/66.1 |
| 10,828,739 | B2 * | 11/2020 | Ziegltrum | B23Q 17/0952 |
| 11,084,139 | B2 * | 8/2021 | Kalhori | B23Q 17/0957 |
| 11,130,182 | B2 | 9/2021 | Chen | |
| 11,311,959 | B2 * | 4/2022 | Hardwick | B22F 12/50 |

(Continued)

FOREIGN PATENT DOCUMENTS

| | | | | |
|---|---|---|---|---|
| CN | 104139322 A | * 11/2014 | | B23Q 17/0966 |
| CN | 104139322 B | 6/2016 | | |

(Continued)

OTHER PUBLICATIONS

Zhang Min et al.; Power supply device for monitoring power supply in machining process of machining center; CN 114552747; EPO English Machine Translation; May 27, 2022; pp. 1-10 (Year: 2022).*

*Primary Examiner* — Bayan Salone

(74) *Attorney, Agent, or Firm* — CKC & Partners Co., LLC

(57) ABSTRACT

A self-powered sensing tool holder suitable for processing process is provided. The self-powered sensing tool holder includes a tool holder unit, a sensing unit, an electric power generation module, and a shell. The tool holder unit includes a base and a body disposed over the base. The sensing unit is disposed over the body and configured to detect data of the tool holder unit. The electric power generation module is disposed over the body and configured to provide the power for the tool holder unit. The shell covers the body and the sensing unit.

13 Claims, 11 Drawing Sheets

(56) References Cited

U.S. PATENT DOCUMENTS

| | | | | |
|---|---|---|---|---|
| 11,992,910 | B2 * | 5/2024 | Bleicher | B23Q 11/127 |
| 2018/0311779 | A1 * | 11/2018 | Ziegltrum | B23Q 17/0985 |
| 2019/0001456 | A1 * | 1/2019 | Kalhori | B23Q 17/0952 |
| 2020/0206829 | A1 * | 7/2020 | Chen | B23B 31/02 |
| 2021/0394285 | A1 * | 12/2021 | Bojanowski | B23C 5/28 |
| 2022/0072627 | A1 * | 3/2022 | Keitzel | B23B 29/046 |
| 2024/0387888 | A1 * | 11/2024 | Matsuoka | H01M 50/284 |
| 2025/0205840 | A1 * | 6/2025 | Yang | B23Q 3/15526 |

FOREIGN PATENT DOCUMENTS

| | | | | | |
|---|---|---|---|---|---|
| CN | 110014173 | A | * | 7/2019 | B23Q 17/09 |
| CN | 215147392 | U | * | 12/2021 | |
| CN | 115026633 | A | * | 9/2022 | B23Q 17/0966 |
| CN | 114552747 | B | * | 10/2024 | H02K 35/04 |
| DE | 102004050270 | B4 | * | 7/2008 | B23Q 1/0009 |
| EP | 1439026 | A1 | * | 7/2004 | A61B 90/98 |
| TW | 202026093 | A | | 7/2020 | |
| TW | 202210199 | A | * | 3/2022 | |
| TW | M633571 | U | * | 11/2022 | |
| TW | M634339 | U | * | 11/2022 | |
| WO | WO-2023054445 | A1 | * | 4/2023 | B25F 5/00 |

* cited by examiner

SELF-POWERED SENSING TOOL HOLDER

RELATED APPLICATION

This application claims priority to Taiwan Application Serial Number 112149835, filed Dec. 20, 2023, which is herein incorporated by reference in its entirety.

BACKGROUND

Field of Invention

The present disclosure relates to a sensing tool holder. More particularly, the present disclosure relates to a self-powered sensing tool holder.

Description of Related Art

During the processing process of the tool, due to inappropriate operation or setting mistake, it is easy to cause damage to the tool, which may further lead to processing inaccuracies and processing errors. Currently, sensing units are disposed over the tool holder to detect various data of the tool during the processing process.

SUMMARY

Some embodiments of the present disclosure provide a self-powered sensing tool holder that generates an alternating current (AC), by a coil and a magnet array inducing a current magnetic effect during the rotation of the tool holder. The AC generated by the coil and the magnet array is stored in a capacitance module and transformed into a direct current (DC) for the required components. The design can make the tool holder have advantages of the stable power supply, continuous processing and continuous detecting data of the tool holder and the design solves the issues of the battery run time under a long-term usage, thereby extending the processing time and enhancing the processing efficiency.

Some embodiments of the present disclosure provide a self-powered sensing tool holder suitable for processing process including a tool holder unit, a sensing unit, an electric power generation model, and a shell. The tool holder unit includes a base and a body disposed over the base. The sensing unit configured to detect data of the tool holder unit is disposed over the body. The electric power generation module configured to provide the power for the tool holder unit is disposed over the body. The shell covers the body and the sensing unit.

According to an example of the present disclosure, the self-powered sensing tool holder is described above, wherein the power generation module includes a coil, a capacitance module and a magnet assembly. A center line of the coil is interlaced with an axis of the body. The capacitance module electrically connects to the coil. The magnet assembly is adjacent to the coil and includes a magnet array. The magnet array includes a first magnet and a second magnet, which have opposite magnetic polarities.

According to an example of the present disclosure, the self-powered sensing tool holder is described above, wherein the coil is off-axis disposed at the electric power generation module.

According to an example of the present disclosure, the self-powered sensing tool holder is described above, wherein the magnet assembly and the tool holder unit is spaced apart from each other by a space between the shell and the magnet array.

According to an example of the present disclosure, the self-powered sensing tool holder is described above, wherein the magnet assembly further includes a first upper magnetic ring and a first lower magnetic ring and the magnet array is disposed between the first upper magnetic ring and the first lower magnetic ring.

According to an example of the present disclosure, the self-powered sensing tool holder is described above, wherein the electrical power generation module further includes a second upper magnetic ring and a second lower magnetic ring. The second upper magnetic ring and the second lower magnetic ring are at an upper side and a lower side of the coil, respectively and the second upper magnetic ring, the second lower magnetic ring, the first upper magnetic ring and the first lower magnetic ring have a same magnetic polarity.

According to an example of the present disclosure, the self-powered sensing tool holder is described above, wherein a flexible circuit board is disposed in a space between the shell and the body.

According to an example of the present disclosure, the self-powered sensing tool holder described above further includes a transmitting unit disposed at the flexible circuit board and configured to transmit the data.

According to an example of the present disclosure, the self-powered sensing tool holder described above further includes a flow channel. The flow channel having an inlet and an outlet, the inlet communicates with a passage of the base, and the flow channel is a spiral structure.

According to an example of the present disclosure, the self-powered sensing tool holder is described above, wherein the body further includes an air cavity between the channel and the sensing unit.

According to an example of the present disclosure, the self-powered sensing tool holder is described above, wherein the electric power generation module comprises a coil, and a center line of the coil is interlaced with an axis of the body, a magnet assembly adjacent to the coil and a support adjacent to the magnet assembly and comprising a spring configured to adjust a space between the magnet assembly and the tool holder unit.

According to an example of the present disclosure, the self-powered sensing tool holder is described above, wherein the body is a powder bed fusion member.

According to an example of the present disclosure, the self-powered sensing tool holder is described above further includes a fixing unit disposed over the body and configured to fix a tool.

According to an example of the present disclosure, the self-powered sensing tool holder is described above, wherein the body comprises a flow channel having an inlet and an outlet, the inlet communicates with a passage of the base, and the inlet and the outlet of the flow channel are both located on the axis of the body.

According to an example of the present disclosure, the self-powered sensing tool holder is described above further includes a flexible circuit board disposed in a space between the shell and the body, and a transmitting unit disposed at the flexible circuit board and configured to transmit the data, wherein the shell comprises a window corresponding to the transmitting unit.

Some embodiments of the present disclosure provide a self-powered sensing tool holder suitable for processing process including a tool holder unit, a sensing unit, an electric power generation model, and a shell. The tool holder unit includes a base and a body. The body is disposed over the base, of which the body comprises a first portion, a second portion and a third portion, the second portion of the body is between the first portion and the third portion of the body, and the first and third portions of the body protrudes from the second portion of the body. The sensing unit configured to detect data of the tool holder unit is disposed over the body. The electric power generation module configured to provide the power for the tool holder unit is disposed over the body. The shell covers the body and the sensing unit.

According to an example of the present disclosure, the self-powered sensing tool holder is described above, wherein the shell comprises non-magnetic material.

According to an example of the present disclosure, the base comprises a first portion and a second portion connected to the first portion, wherein the first portion of the base tapers away from the second portion.

Some embodiments of the present disclosure provide a self-powered sensing tool holder suitable for processing process including a tool holder unit, a sensing unit, and an electric power generation model. The tool holder unit includes a base and a body. The base includes a first portion and a second portion. The body is disposed over the second portion, of which the body has a circular trench. The sensing unit configured to detect data of the tool holder unit is disposed over the body. The electric power generation module is disposed over the body, of which the electric power generation module is configured to provide a power for the tool holder unit, and the electric power generation module comprises a coil in the circular trench.

According to an example of the present disclosure, the self-powered sensing tool holder is described above, wherein a width of the first portion of the base decreases from a first end of the first portion of the base to a second end of the first portion of the base.

DETAILED DESCRIPTION

Reference will now be made in detail to the present embodiments of the disclosure. However, it should be understand that the examples of the disclosure provide many practicable concepts for implementing in various subject matters. The examples discussed and disclosed herein are for the illustration only, and are not intended to limit the scope of the disclosure. The term "first" and "second" used herein do not indicate specific order or sequence, but are only used to distinguish the units or operations described in same technical terms.

Figure 1A:
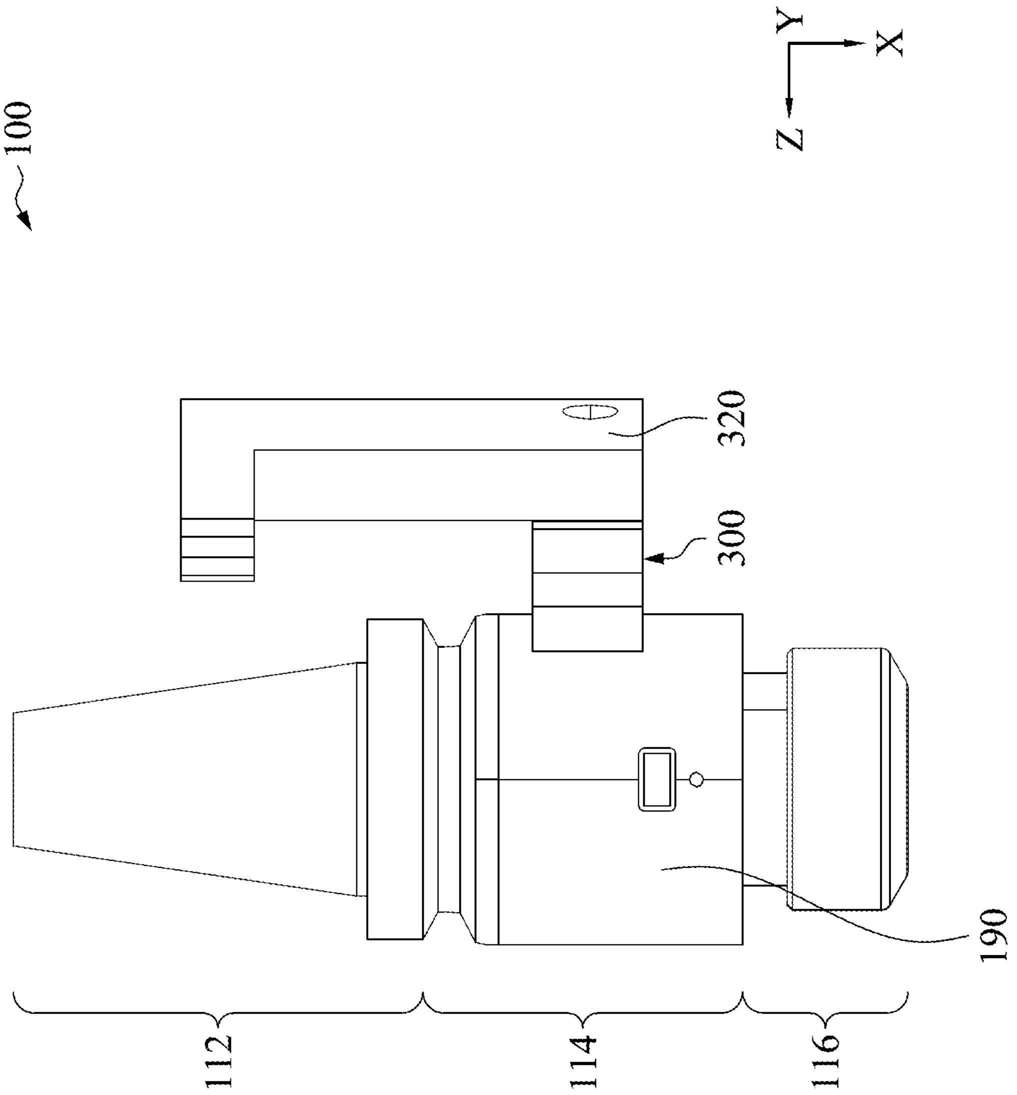
FIG. 1A is a stereoscopic schematic diagram of the self-powered tool holder in accordance with some embodiments of the present disclosure.
Figure 1B:
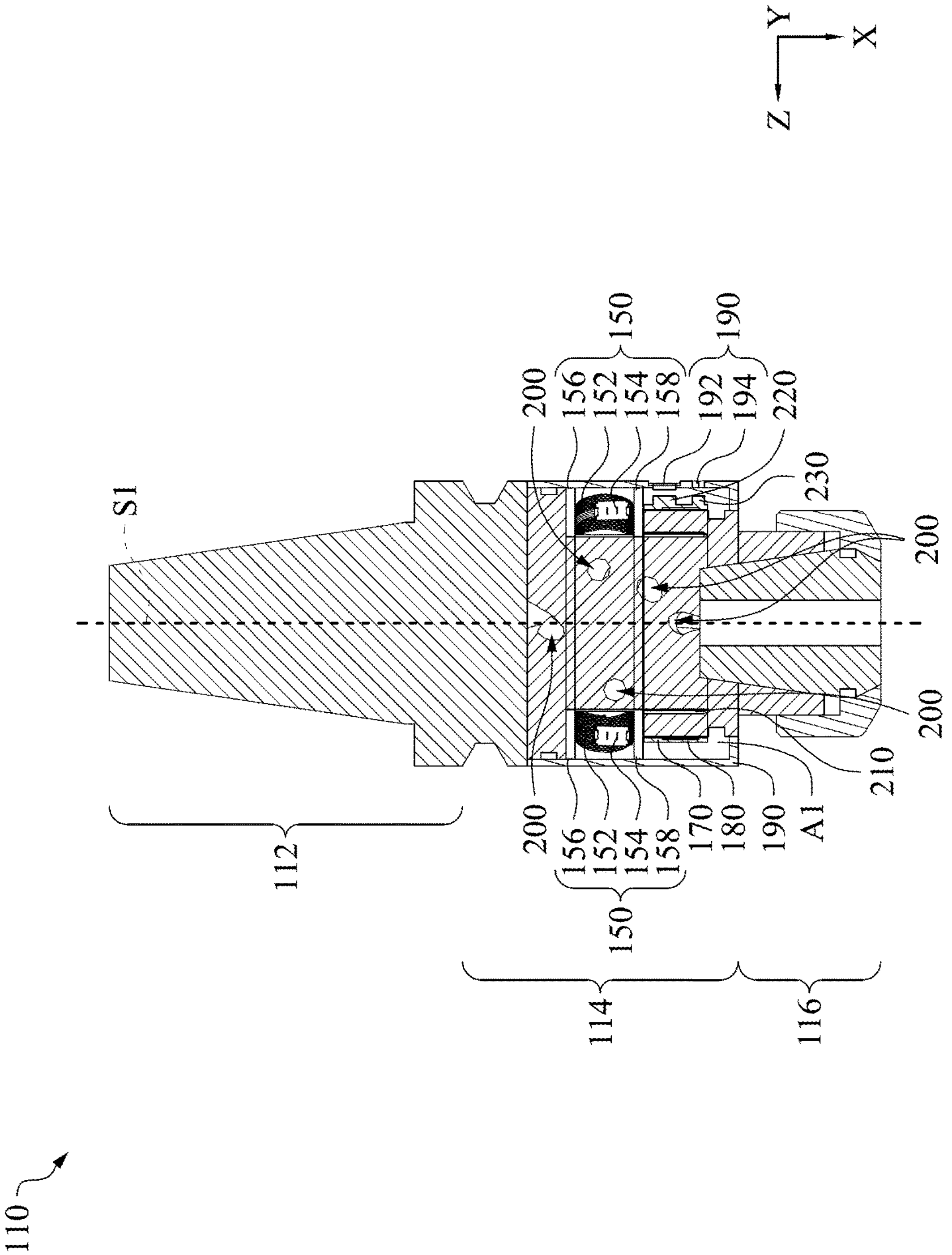
FIG. 1B is a schematic side view of the self-powered tool holder in accordance with some embodiments of the present disclosure.

FIG. 1A is a stereoscopic schematic diagram of the self-powered sensing tool holder 100 in accordance with some embodiments of the present disclosure. FIG. 1B is the schematic side view of FIG. 1A. Please refer to FIG. 1A and FIG. 1B. The self-powered sensing tool holder 100 includes a tool holder unit 110, a sensing unit 180, an electric power generation module 150, a shell 190, a flexible circuit board 170, a transmitting unit 220 and an indicating unit 230.

The tool holder unit 110 includes a base 112, a body 114 and a fixing unit 116. The body 114 can be disposed over the base 112 by an additive manufacturing method, e.g., a powder bed fusion (PBF) method, but it should be noticed that this example should not limit the scope of the embodiment. The fixing unit 116 is configured to fix a tool (not illustrated), for example a screw nut. In some embodiments of the present disclosure, the fixing unit 116 can be installed over the body 114 by an appropriate method, e.g., a plug-in tenon (not illustrated).

In some embodiments of the present disclosure, the body 114 includes a flow channel 200, which includes an inlet and an outlet communicating to a passage (not illustrated) of the base 112, and the flow channel 200 is a spiral structure. The flow channel 200 and the body 114 are stacked together by the additive manufacturing method and the fabrication of the flow channel 200 do not damage to the structure of the body 114.

As shown in FIG. 1A and FIG. 1B, the sensing unit 180 is disposed over the body 114 and configured to detect data of the tool holder unit 110. In detail, the body 114 can change the arrangements and the number of the sensing unit 180 according to the functional requirement and for example, in some embodiments, the body 114 can disposed multiple sensing units 180 which disposed at multiple assembling recesses (not Illustrated). In some embodiments, the axis S1 can extend along a direction X and multiple sensing units 180 are disposed on substantially the same plane formed by a direction Z and a direction Y which are substantially perpendicular to direction X. For example, these assembling recesses take the axis S1 of the body 114 as the symmetry axis and are symmetrically disposed in pairs over the body 114. Same as the flow channel 200, the assembling recesses and the body 114 are stacked together by the additive manufacturing method and the fabrication of the assembling recesses do not damage to the structure of the body 114, of which the fabrication of the assembling recesses can improve the angular momentum balance and the convenience of the body 114.

In addition, the sensing unit 180 can use different installation angle, such as 45°, 90° or 180°, depend on the requirement of the processing process, such as cutting process, drilling process or composite processing process. Thus, according to the difference of the installation angle, the sensing unit 180 can detect a lateral pressure, normal pressure or torque and provide a sensing data.

As shown in FIG. 1A and FIG. 1B, the electric power generation module 150 is disposed over the body 114, of which the electric power generation module 150 is configured to provide the power for the self-powered sensing tool holder. In detail, the electric power generation module 150 includes a coil 152, the capacitance module 154, the upper magnetic ring 156, the lower magnetic ring 158 and the magnet assembly 300.

The coil 152 can be designed as the induced coils which are winded by a flexible circuit board. The center line of the coil can be interlaced with the axis S1, for example the coil 152 can substantially perpendicular to the axis S1, and the coil 152 can be arranged according to the functional requirement. For example, in some embodiments, the coil 152 is off-axis disposed at the electric power generation module. In some embodiments of the present disclosure, the upper side and the lower side of the coil 152 can be respectively disposed an upper magnetic ring 156 and a lower magnetic ring 158 which have the same magnetic polarity.

The capacitance module 154 electrically connected to the coil 152 is configured to transform the AC generated by the coil 152 to the DC and store the DC. The arrangement and the number of the capacitance module can be changed according to the functional requirement. For example, in some embodiments, multiple capacitance modules can be disposed between the coils 152 (refer to the following FIG. 3B).

Figure 2:
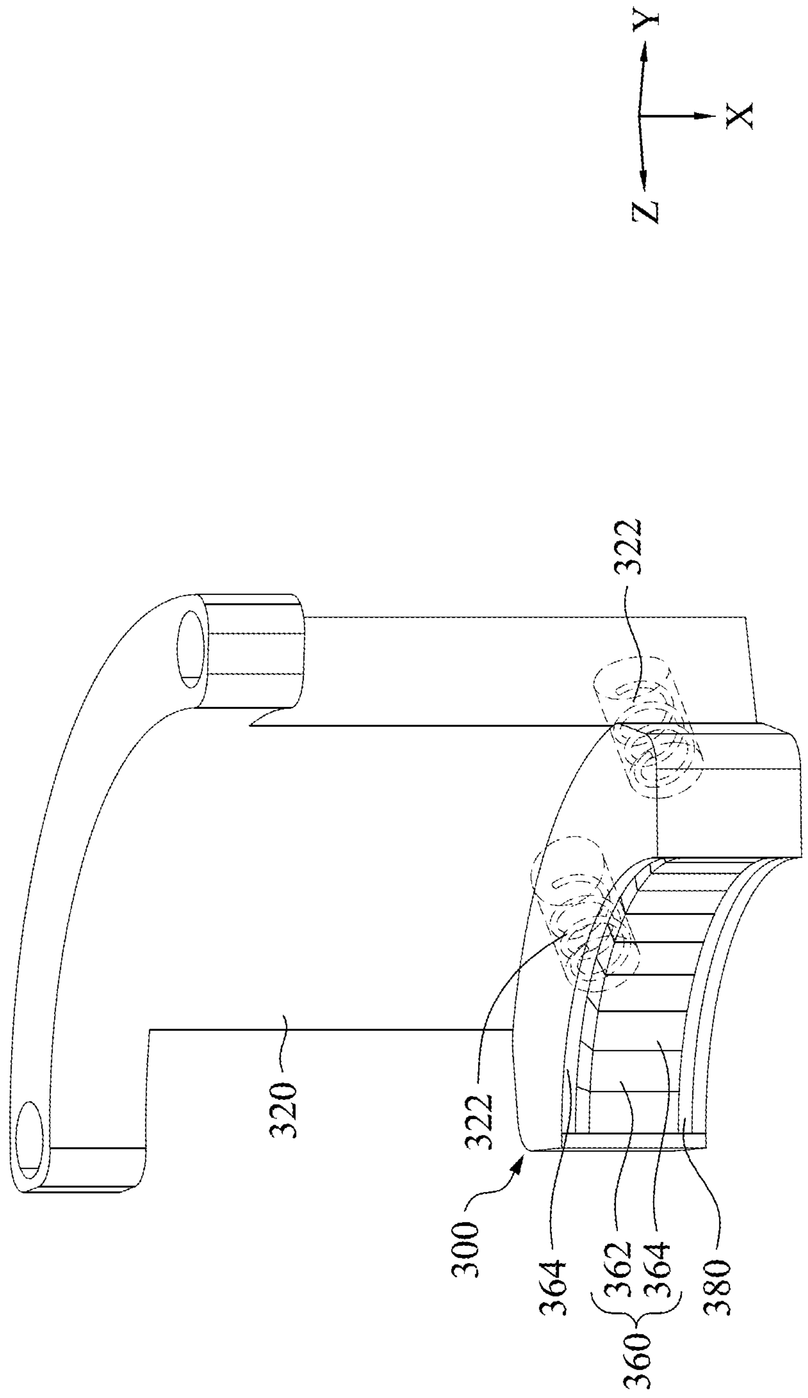
FIG. 2 is a stereoscopic schematic diagram of the magnet assembly of the self-powered tool holder in accordance with some embodiments of the present disclosure.

The magnet assembly 300 is disposed nearby the coil 152 and configured to produce the magnetic field for the power generation. For the convenience of the explanation, in this disclosure, make the magnet assembly 300 dispose at a side that the coils 152 are toward the divergence direction Z. FIG. 2 is a stereoscopic schematic diagram of the magnet assembly 300 of the self-powered sensing tool holder 100 in accordance with some embodiments of the present disclosure. Refer to FIG. 1A and FIG. 2, the magnet assembly 300 includes a magnet array 360 which includes a first magnet 362 and a second magnet 364. The first magnet 362 and the second magnet 364 have opposite magnetic polarity. In this embodiment, the number of the first magnet 362 and the second magnet 364 can be multiple (five are shown in the figures), and the first magnet 362 and the second magnet 364 are interlaced with each other along the direction Y. In other embodiment, the number of the first magnet 362 and the second magnet 364 can be changed according to the different functional requirement. Furthermore, the magnet assembly 300 further includes an upper magnetic ring 340 and a lower magnetic ring 380 where the magnet array disposed between. In addition, the upper magnetic ring 340 and the lower magnetic ring 380 have the same magnetic polarity with the upper magnetic ring 156 and the lower magnetic ring 158.

Furthermore, the electric power generation module 150 further includes a support 320 configured to support the magnet assembly 300. In some embodiments, a spring 322 is disposed in the support 320. The spring 322 can adjust the position of the magnet assembly 300, and thus adjust the space between the magnet assembly 300 and the body 114 to maintain the power generation efficiency of the electric power generation module.

As shown in FIG. 1A and FIG. 1B, the shell 190 covers the body 114 and the sensing unit 180. The shell 190 can be fabricated by any non-magnetic metal materials. During the processing process, e.g., cutting process, the shell 190 can prevent the cutting fluid and chips from spraying to the body 144, so that the shell 190 can effectively protect the components inside the body 114, e.g., the sensing unit 180 and extend the lifetime of the components inside the body 114.

The flexible circuit board 170 is disposed in the space A1 between the shell 190 and the body 114 and the flexible circuit board 170 surround the body 114. The flexible circuit board 170 can be fabricated by the same flexible circuit board as the coil 152 or other flexible materials. In some embodiments, the flexible circuit board 170 can surround the body 114 that can make the flexible circuit board 170 uniformly weight on the body 114 and improve the dynamic equilibrium.

In some embodiments, a transmitting unit 220 is disposed at the flexible circuit board 170 and electrically connected to the sensing unit 180. The transmitting unit 220 is configured to transmit the data of the sensing unit 180 to the external device. In some embodiments, an indicating unit 230 is disposed at the flexible circuit board 170 and electrically connected to the sensing unit 180. The indicating unit 230 can show different signals, e.g., green light for standby state according to the working state of the tool holder unit 110.

Furthermore, as the shell 190 is fabricated by the metal materials, the design can restrict the transmitting unit 220 from transmitting the data of the body 114 detecting by the sensing unit 180 and the signal of the indicating unit 230. In some embodiments, a window 192 corresponding to the transmitting unit 220 and indicating unit 230 can be disposed on the shell 190. This arrangement can prevent the metal material from restricting the transmitting unit 220 from transmitting the data of the body 114 detecting by the sensing unit 180, and thus improve the transmitting efficiency of the transmitting unit 220. In some embodiment, a window 194 can be disposed on the shell 190 and this arrangement can prevent the metal material of the shell 190 from blocking the signal of the indicating unit 230. The window 192 and the window 194 can be fabricated by glass, acrylic, or any suitable materials.

Figure 3A:
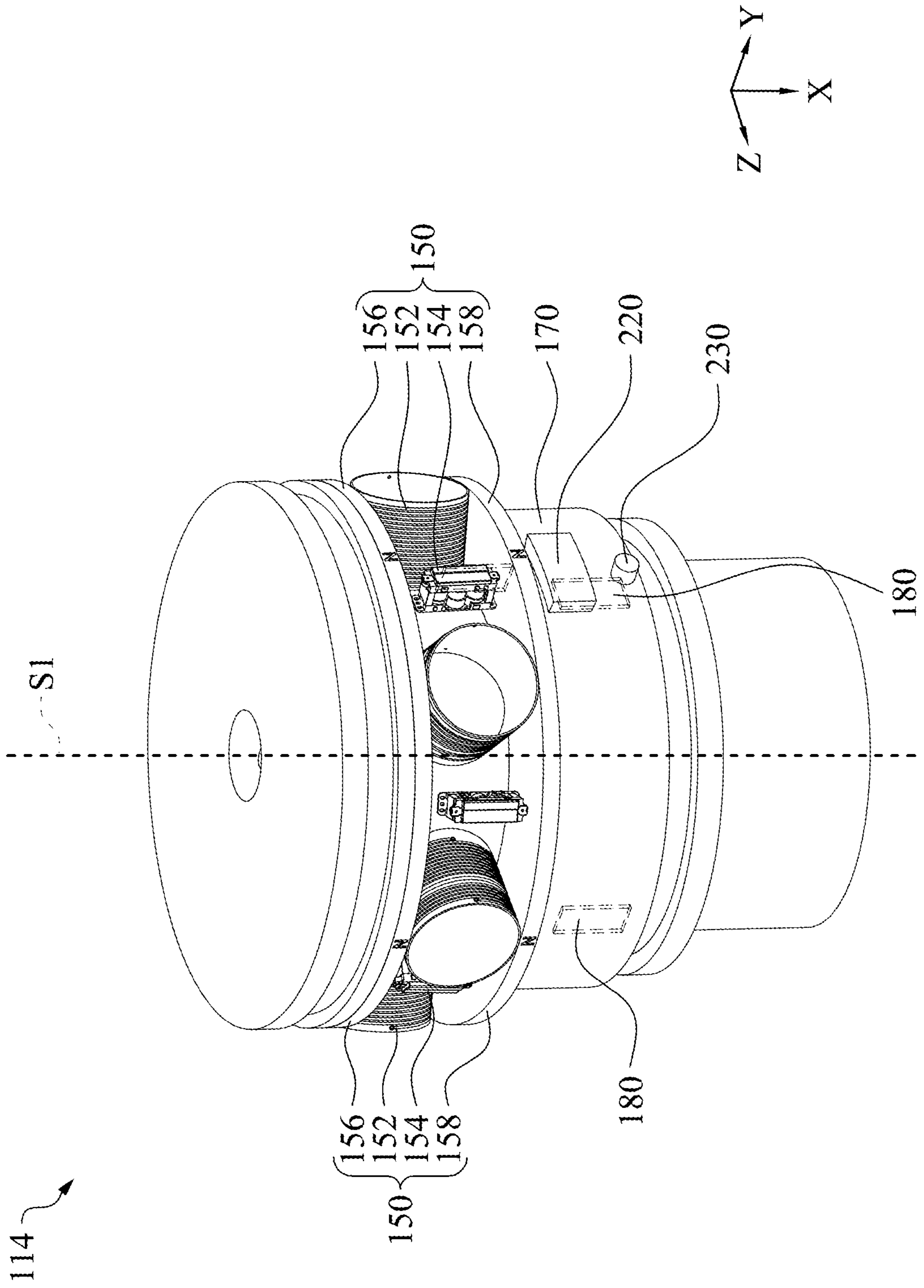
FIG. 3A is a schematic side view of the body of the self-powered tool holder in accordance with some embodiments of the present disclosure.
Figure 3B:
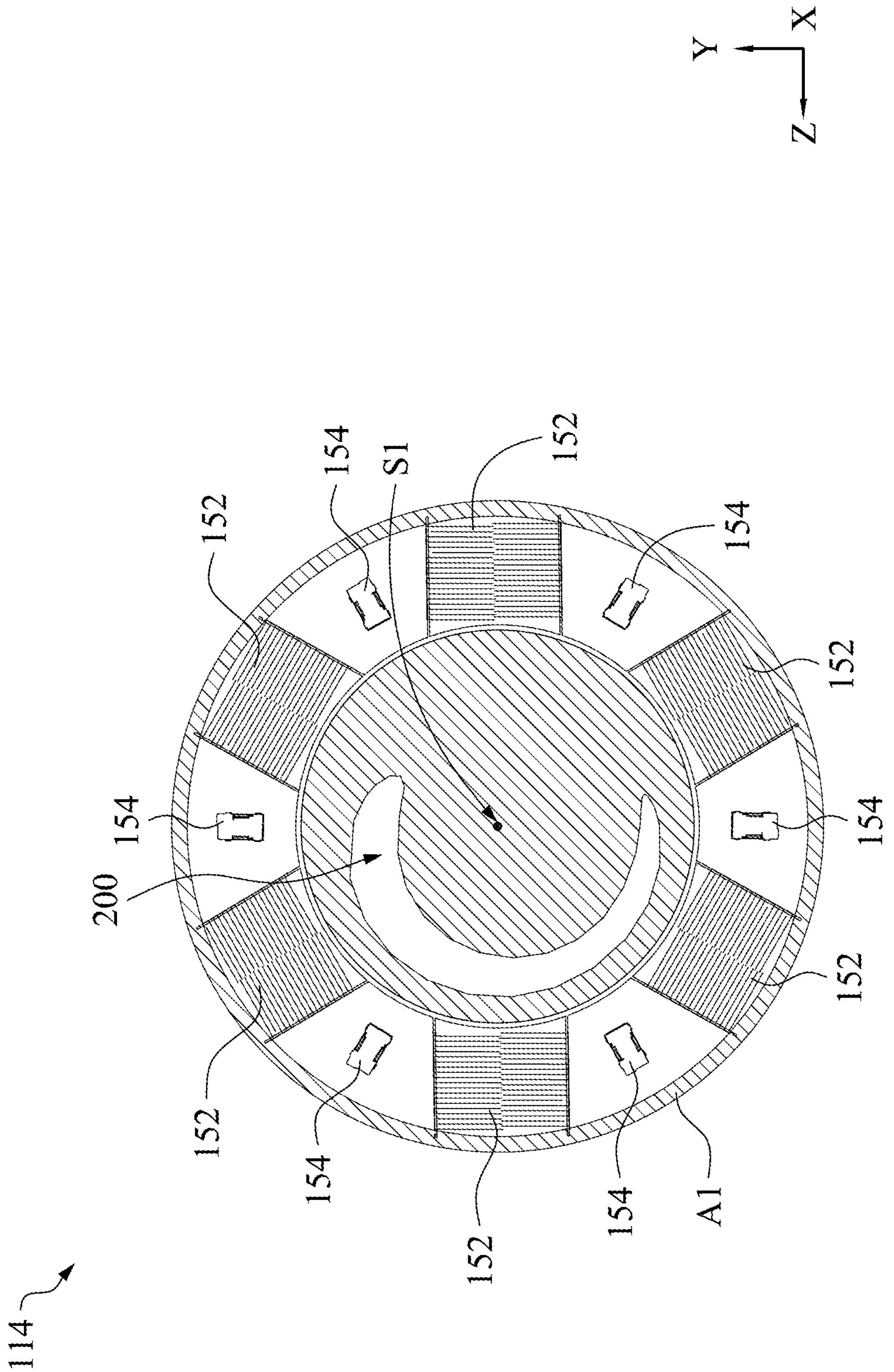
FIG. 3B is a schematic top view of the self-powered tool holder in accordance with some embodiments of the present disclosure.
Figure 3C:
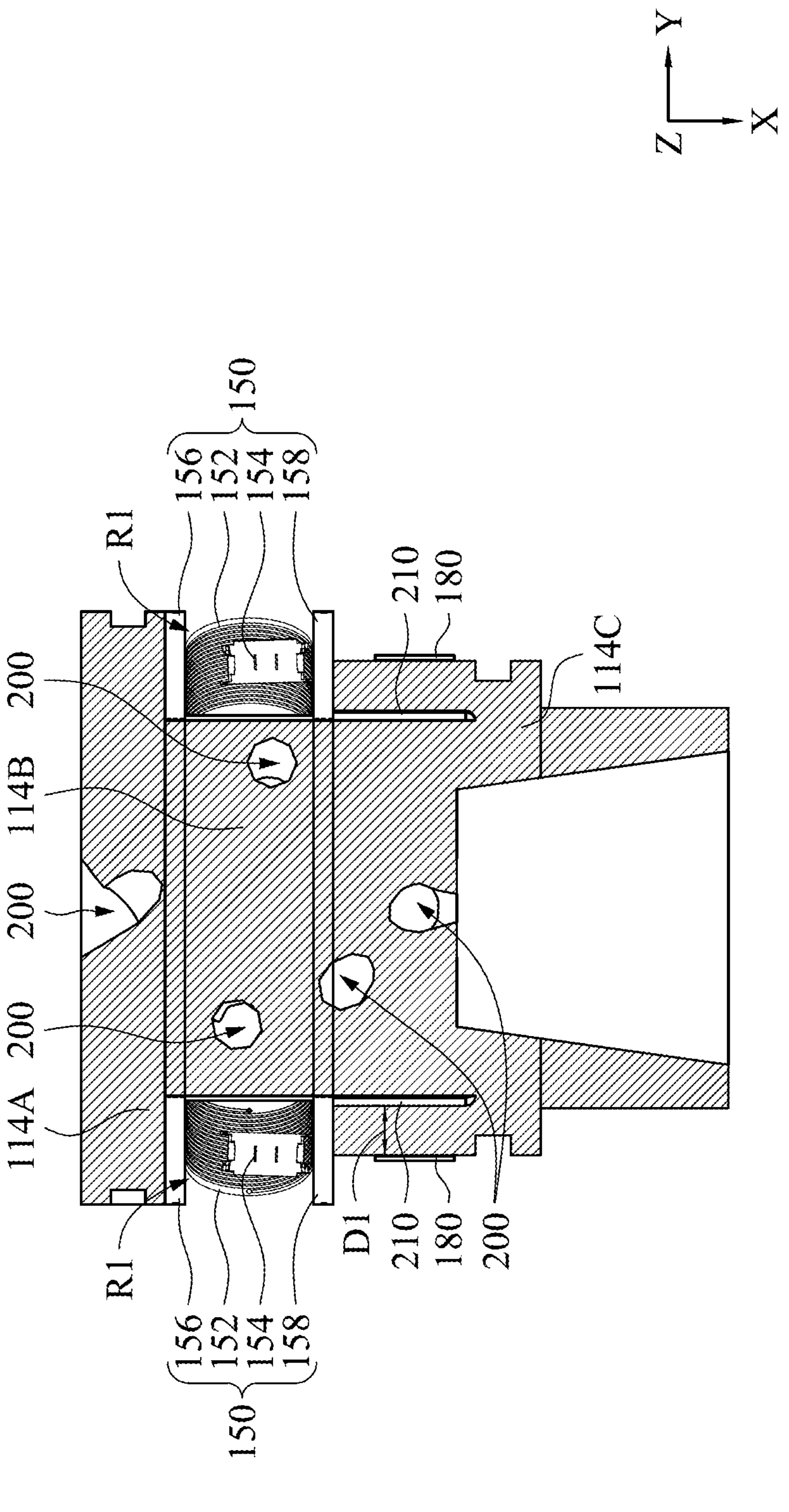
FIG. 3C is a schematic cross sectional view of the self-powered tool holder in accordance with some embodiments of the present disclosure.

FIG. 3A is a schematic side view of the body 114 of the self-powered sensing tool holder 100 in accordance with some embodiments of the present disclosure. FIG. 3B is the schematic top view of the FIG. 3A. FIG. 3C is schematic cross sectional view of the FIG. 3A. Please refer to FIG. 3A, FIG. 3B and FIG. 3C. As shown in FIG. 3A and FIG. 3B, in some embodiments, six coils 152 and six capacitance modules 154 can be disposed at the electric power generation module 150, of which the center line of each coil 152 is substantially perpendicular to the axis S1, and the capacitance module 154 is electrically connected to the coil 152 and configured to store the electric power generated by the coil 152. The center line of the multiple coils 152 and the capacitance modules 154 can be disposed on substantially the same plane formed by the direction Z and the direction Y. For example, the coils 152 take the axis S1 as the symmetry axis and are symmetrically disposed in pairs and the capacitances module 154 take the axis S1 as the symmetry axis and are symmetrically disposed in pairs. This design can improve the dynamic balance of the tool holder unit 110. It should be noticed that this example should not limit the scope of the embodiment. In other embodiment, the coils 152 can be applied unsymmetrically arrangement and the capacitance modules 154 can also be applied unsymmetrically arrangement. In addition, during the power generation, appropriate liquid can flow the flow channel 200 of the body 114 and take away the heat energy generated by the coils 152, further stabilizing the working temperature of the tool holder unit 110.

In some embodiment, four sensing units 180 can be disposed over the body 114 and take the axis S1 as the symmetry axis and are symmetrically disposed in pairs to detect the data of the tool holder unit 110, but it should be noticed that this example should not limit the scope of the embodiment. In other embodiment, the sensing units 180 can also be applied unsymmetrically arrangement. Furthermore, in some embodiment, the flexible circuit board 170, where the transmitting unit 220 and the indicating units 230 can be disposed at, surrounds the body 114 and covers the four sensing units 180.

As shown in FIG. 3A and FIG. 3C, in some embodiment, the body 114 can have a first portion 114A; a second portion 114B and a third portion 114C. The first portion 114A and the third portion 114C can protrude the second portion 114B. The second portion 114B can have a circular trench to accommodate the coil 152, the capacitance module 154, the upper magnetic ring 156 and the lower magnetic ring 158. The width of the protruding portion of the third portion 114C relative to the second portion 114B need to remain fixed to avoid the installation issue of the upper magnetic ring 156 and the lower magnetic ring 158.

In addition, in some embodiment, the body 114 can have multiple air cavities 210 connected to the inner edge of the second portion 114B and located between the flow channel 200 and the sensing unit 180. The air cavities 210 can reduce the thermal conduction between the body 114 and the sensing unit 180 to avoid the sensing unit 180 from lowering the detecting sensitivity.

Figure 4A:
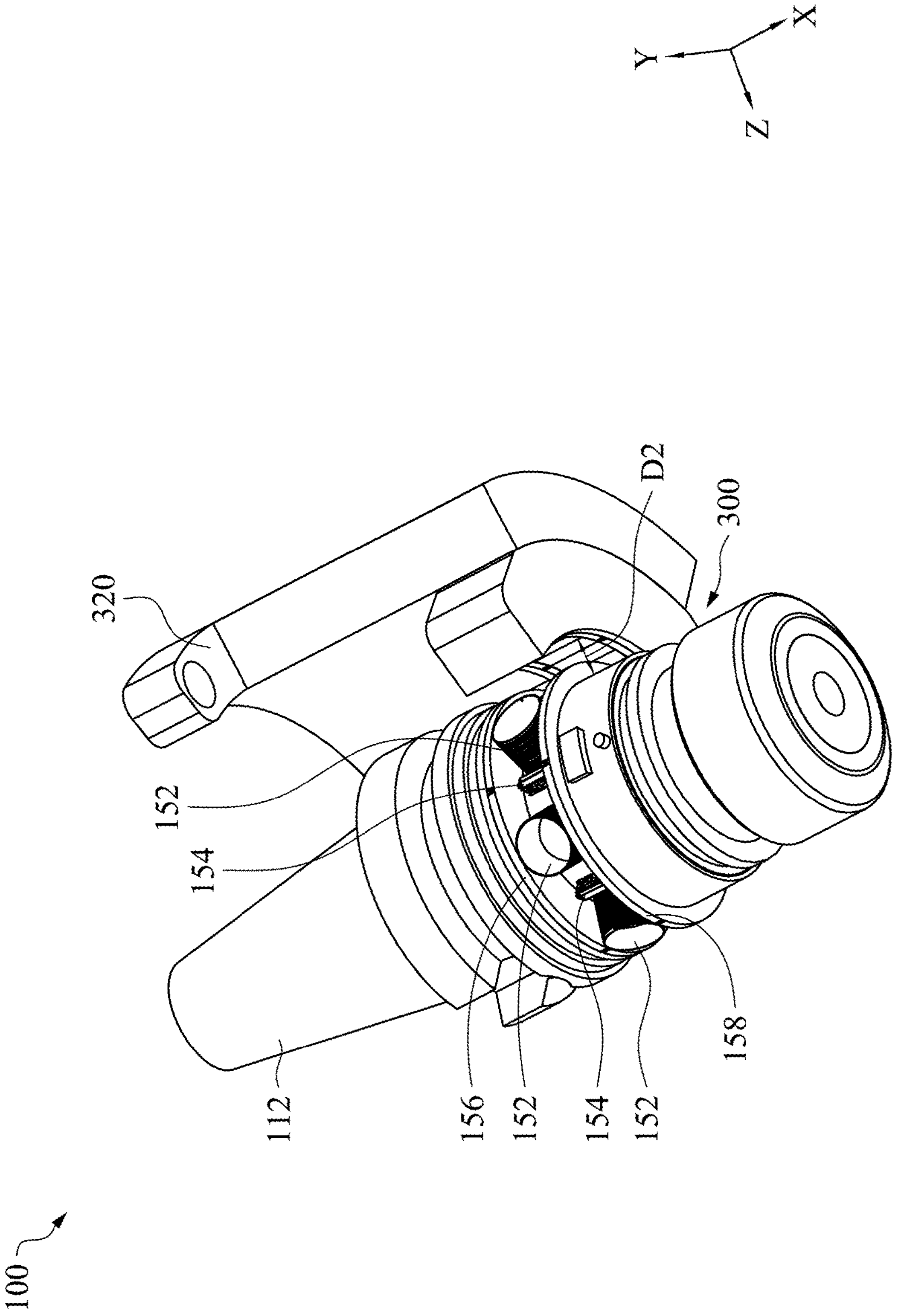
FIG. 4A is a stereoscopic schematic diagram of the self-powered tool holder in accordance with some embodiments of the present disclosure.
Figure 4B:
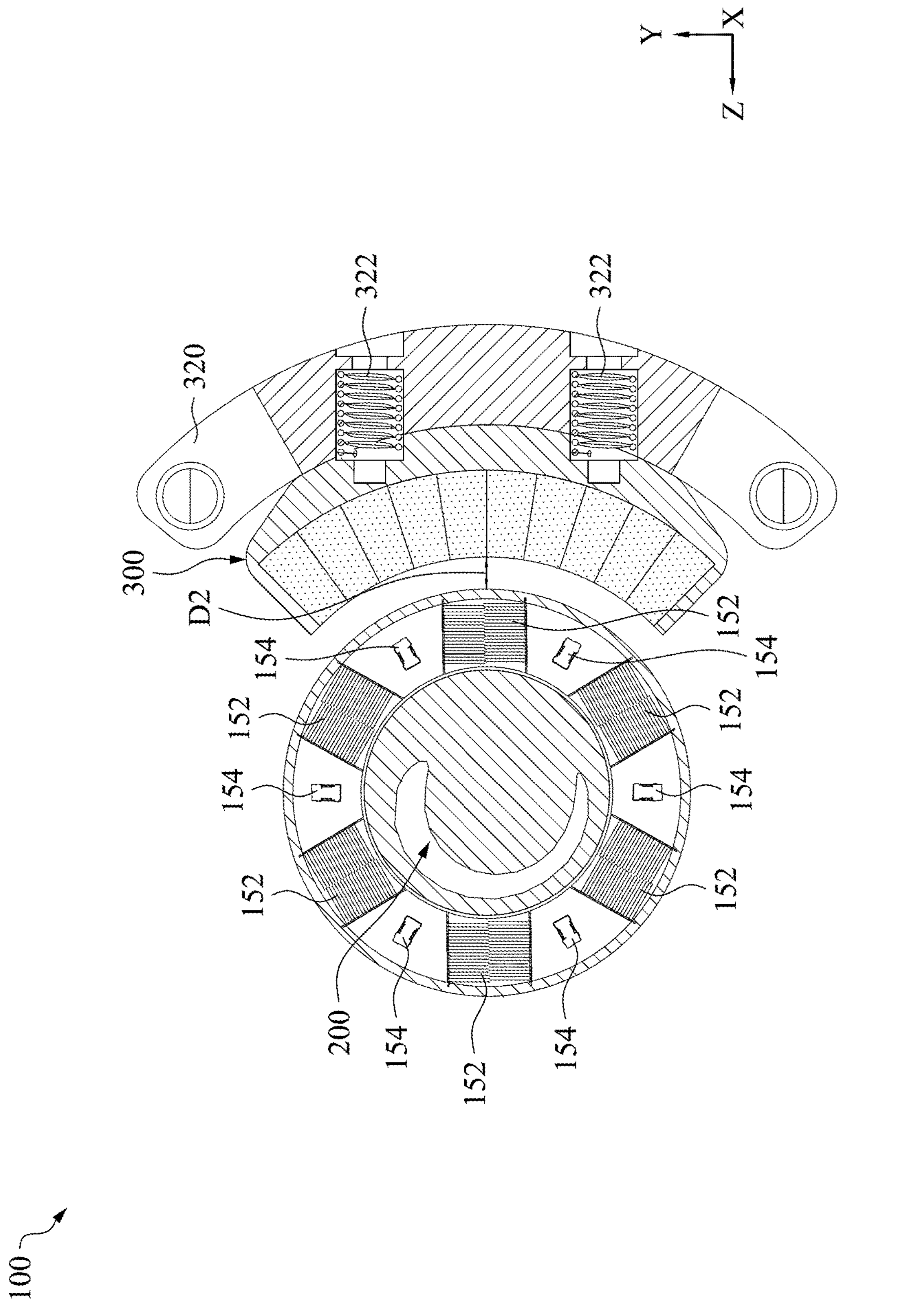
FIG. 4B is a schematic cross sectional view of the self-powered tool holder in accordance with some embodiments of the present disclosure.

FIG. 4A is a stereoscopic schematic diagram of the self-powered sensing tool holder 100, in accordance with some embodiments of the present disclosure. FIG. 4B is a schematic cross section view of FIG. 4A. Please refer to FIG. 4A and FIG. 4B. As shown in FIG. 4A and FIG. 4B, a space D2 between the magnet assembly 300 and the tool holder unit 110 is between the shell 190 and the magnet array 360. The space D2 is formed by the repulsion of the upper magnetic ring 156 and the lower magnetic ring 158 of the electric power generation module and the upper magnetic ring 340 and the lower magnetic ring 380 of the magnet assembly 300 due to the same magnetic polarity, and the space D2 can be adjusted by the spring 322 of the support 320 according to the different processing process and processing machines.

Figure 5:
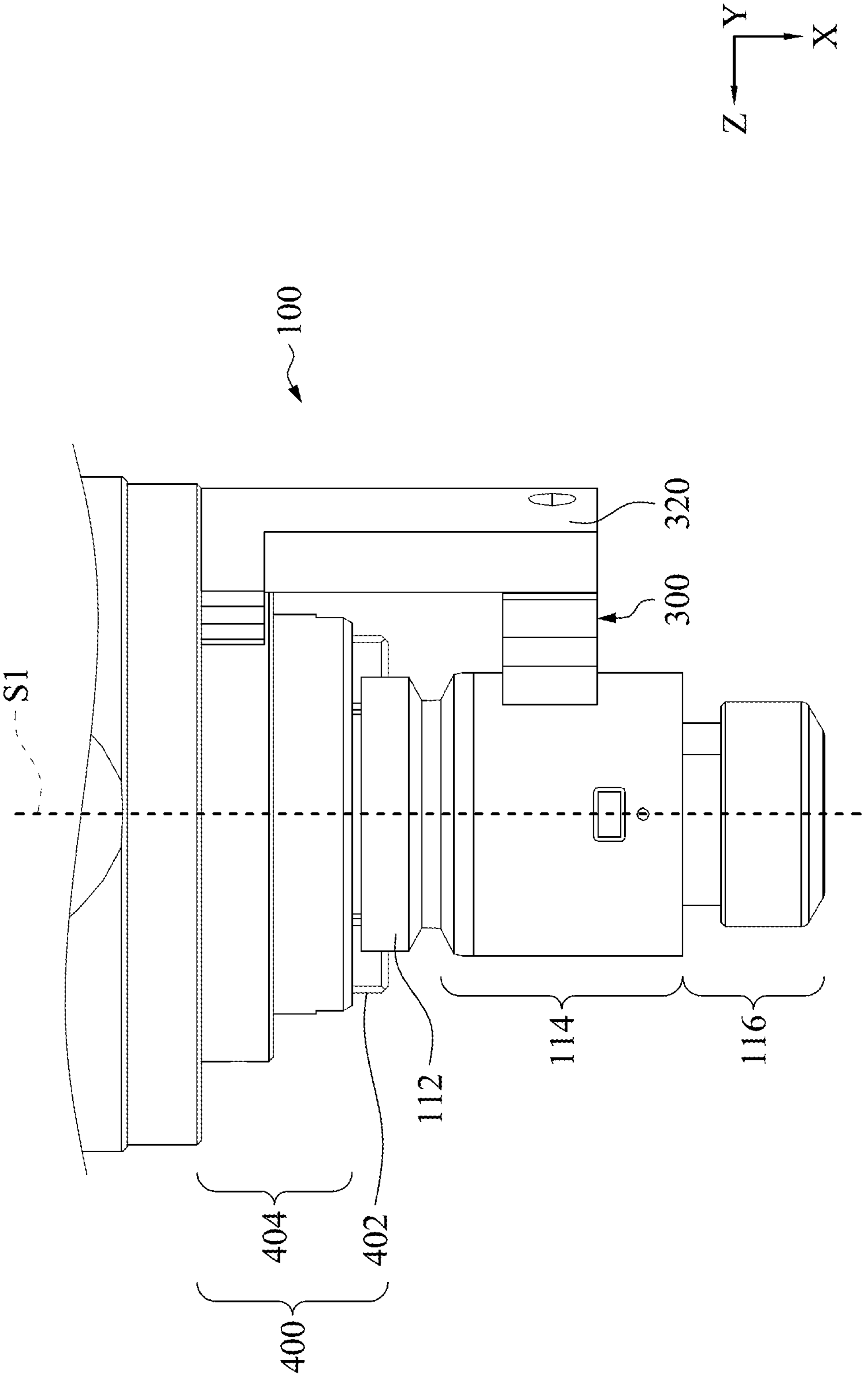
FIG. 5 is a stereoscopic schematic diagram of the self-powered tool holder disposed in a portion of an Installation kit in accordance with some embodiments of the present disclosure.
Figure 6A:
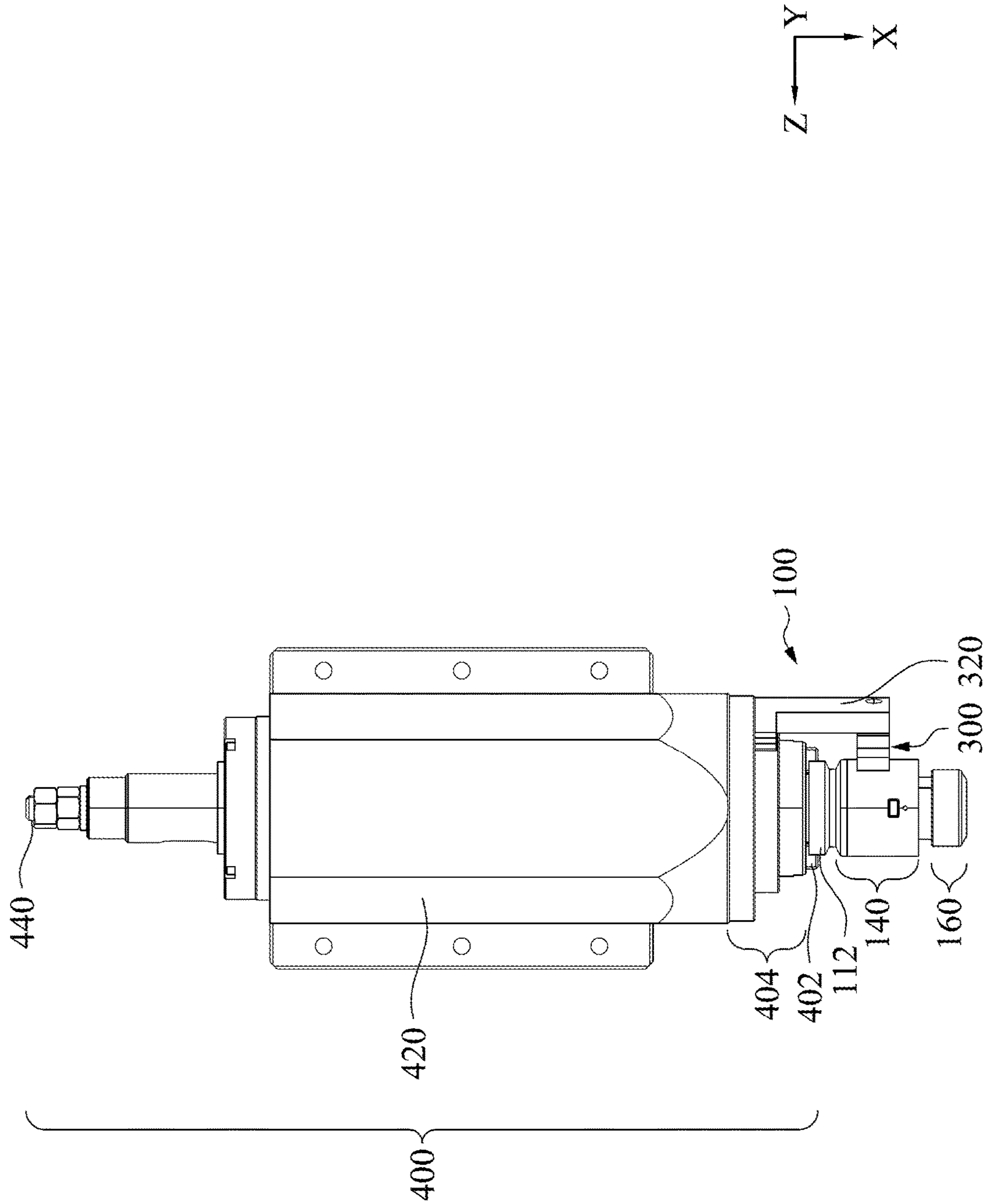
FIG. 6A is a stereoscopic schematic diagram of the self-powered tool holder disposed in the Installation kit in accordance with some embodiments of the present disclosure.
Figure 6B:
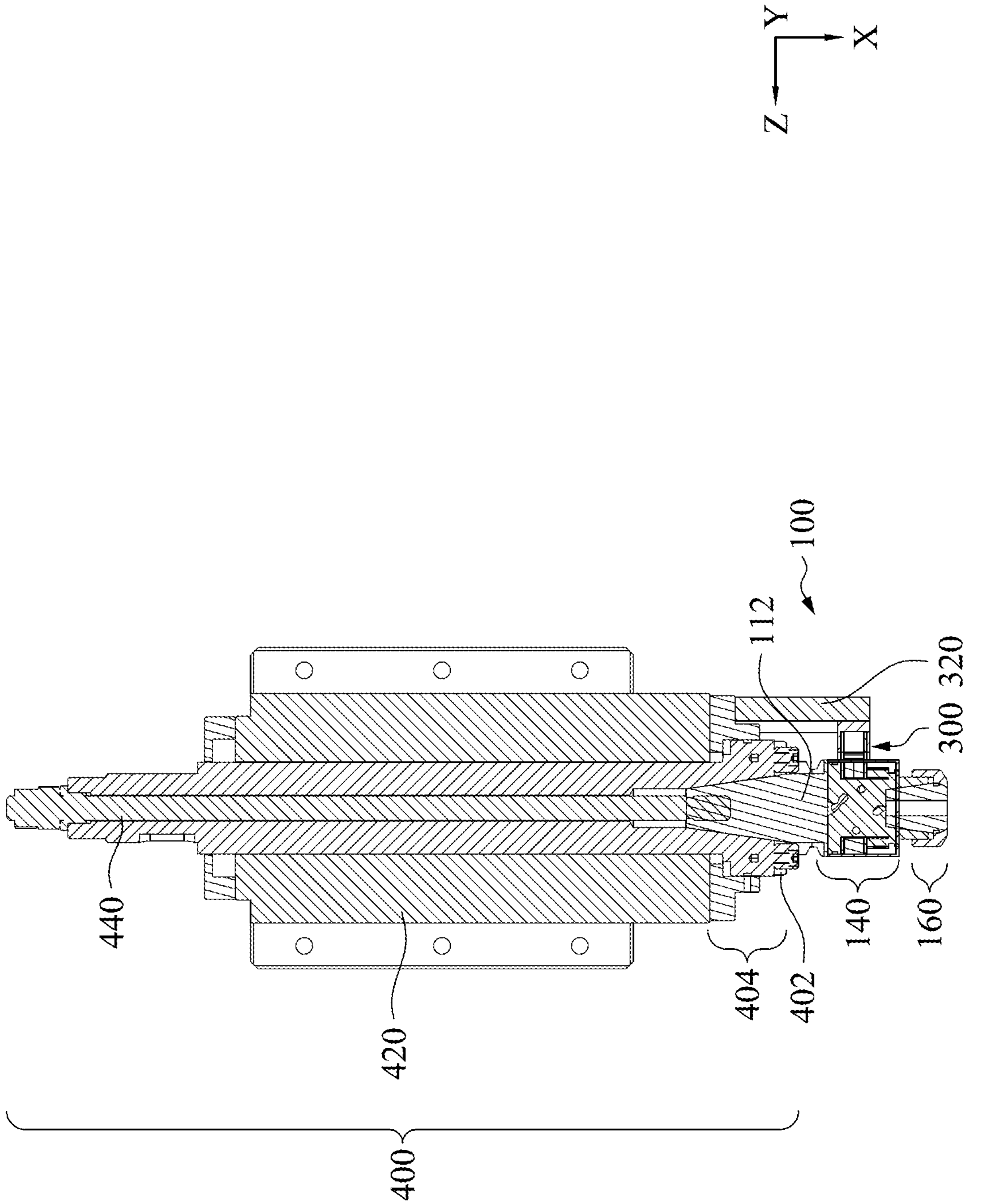
FIG. 6B is a schematic cross sectional view of the self-powered tool holder disposed in the Installation kit in accordance with some embodiments of the present disclosure.

FIG. 5 is a stereoscopic schematic diagram of the self-powered sensing tool holder 100 disposed in a portion of an Installation kit 400, in accordance with some embodiments of the present disclosure. FIG. 6A is a stereoscopic schematic diagram of the self-powered sensing tool holder 100 disposed in the Installation kit 400, in accordance with some embodiments of the present disclosure. FIG. 6B is a schematic cross sectional view of FIG. 6A; please refer to the FIG. 5, FIG. 6A and FIG. 6B. The self-powered sensing tool holder 100 is disposed in the Installation kit 400 made by a shell 420, a spindle 440, and a consolidating portion 404 and a rotational portion 402. The shell 420 has multiple screw holes so that the Installation kit 400 can be installed on the different process machines. The consolidating portion 404 can fix the base 112 of the self-powered sensing tool holder 100 at the installation kit 400, of which the base 112 connects to the spindle 440 of the installation kit 400 and fixes at the rotational portion 402. In the some embodiment, the support 320 and the base 112 can reach relatively fixed by the consolidating portion 404. The spindle 440 can be formed by processing process, e.g., Computer Numerical Control (CNC). It should be noticed that this example should not limit the scope of the embodiment and the installation kit 400 can be changed according to the function or requirement.

Thus, during the processing of the self-powered sensing tool holder 100, the spindle 440 can drive the rotational portion 402 to rotate the tool holder unit 110, and the electric power generation module and the magnet assembly 300 produces the current magnetic effect to generate AC. Subsequently, the AC is stored in the capacitance module 154 and transformed to the DC to achieve self-power, of which the DC provides the power for the components disposed at or electrically connected to the flexible circuit board 170 such as the transmitting unit 220 and the indicating unit.

In addition, the design of the same magnet polarity of the upper magnetic ring 156, lower magnetic ring 158, the upper magnetic ring 340 of the magnet assembly 300 and the lower magnetic ring 380 of the magnet assembly 300 can make the tool holder unit 110 of the self-powered sensing tool holder 100 and the magnet assembly 300 have the minimum safety space (the space D2) and make sure that the self-powered sensing tool holder 100 can process under a safe condition to avoid the risk of a close distance due to the installation error or the damage of the tool holder unit 110 so that the space D2 can protect the tool holder unit 110.

The space D2 can be adjusted by the spring 322 of the support 320 so that the power generation efficiency of the self-powered sensing tool holder 100 could not affect by the processing process. The self-powered sensing tool holder 100 can adjust the space D2 to remain self-power according to the different processing process to be suitable for multiple processing process machines, such as cutting process, drilling process or composite processing process. But it should be noticed that these examples should not limit the scope of the embodiment.

Some embodiments of the present disclosure provide a self-powered sensing tool holder, that generate an alternating current (AC), by a coil and a magnet array inducing a current magnetic effect during the rotation of the tool holder. The AC generated by the coil and the magnet array is stored in a capacitance module and transformed into a direct current (DC) for the required components. The design can make the tool holder have advantages of the stable power supply, continuous processing and continuous detecting data of the tool holder and the design solves the issues of the battery run time under a long-term usage, thereby extending the processing time and enhancing the processing efficiency.

Although the present disclosure has been described with reference to certain embodiments thereof, other embodiments are possible and it will be apparent to those skilled in the art that various modifications and variations can be made to the structure of the present disclosure to achieve the same purpose or achieve the same advantage described by the present disclosure. Those skilled in the art should understand that various modifications, substitutions and variations can be made to the present disclosure without departing from the scope or spirit of the disclosure.

What is claimed is:

1. A self-powered sensing tool holder suitable for processing process, comprising:

a tool holder unit, comprising:

a base; and a body disposed over the base;
a sensing unit disposed over the body, wherein the sensing unit is configured to detect a data of the tool holder unit;
an electric power generation module disposed over the body, wherein the electric power generation module is configured to provide a power for the tool holder unit, and the electric power generation module comprises:
a coil, wherein a center line of the coil is interlaced with an axis of the body;
a capacitance module, electrically connected to the coil; and
a magnet assembly adjacent to the coil, comprising:
a magnet array, wherein the magnet array comprises a first magnet and a second magnet having opposite magnetic polarities:
a first upper magnetic ring; and
a first lower magnetic ring, wherein the magnet array is disposed between the first upper magnetic ring and the first lower magnetic ring; and
a shell covering the body and the sensing unit.

2. The self-powered sensing tool holder of claim 1, wherein the coil is off-axis disposed at the electric power generation module.

3. The self-powered sensing tool holder of claim 1, wherein the magnet assembly and the tool holder unit is spaced apart from each other by a space between the shell and the magnet array.

4. The self-powered sensing tool holder of claim 1, wherein the electrical power generation module further comprises a second upper magnetic ring and a second lower magnetic ring at an upper side and a lower side of the coil, and the second upper magnetic ring, the second lower magnetic ring, the first upper magnetic ring and the first lower magnetic ring have a same magnetic polarity.

5. The self-powered sensing tool holder of claim 1, further comprising:
a flexible circuit board disposed in a space between the shell and the body.

6. The self-powered sensing tool holder of claim 5, further comprising:
a transmitting unit disposed at the flexible circuit board and configured to transmit the data.

7. The self-powered sensing tool holder of claim 1, wherein the body comprises a flow channel having an inlet and an outlet, the inlet communicates with a passage of the base, and the flow channel is a spiral structure.

8. The self-powered sensing tool holder of claim 7, wherein the body further comprises an air cavity between the flow channel and the sensing unit.

9. The self-powered sensing tool holder of claim 1, wherein the electric power generation module further comprises a support adjacent to the magnet assembly and comprising a spring configured to adjust a space between the magnet assembly and the tool holder unit.

10. The self-powered sensing tool holder of claim 1, wherein the body is a powder bed fusion member.

11. The self-powered sensing tool holder of claim 1, wherein the tool holder unit further comprises:
a fixing unit disposed over the body and configured to fix a tool.

12. The self-powered sensing tool holder of claim 1, wherein the body comprises a flow channel having an inlet and an outlet, the inlet communicates with a passage of the base, and the inlet and the outlet of the flow channel are both located on the axis of the body.

13. The self-powered sensing tool holder of claim 1, further comprising:
a flexible circuit board disposed in a space between the shell and the body, and a transmitting unit disposed at the flexible circuit board and configured to transmit the data, wherein the shell comprises a window corresponding to the transmitting unit.

* * * * *